3,794,497
PHOTOGRAPHIC ELEMENT COMPRISING AN OLEFINICALLY UNSATURATED MONOMER AND A PHOTO-LABILE ORGANO COBALT COMPOUND
John Macdonald Pratt, Whitegate, and Brian Ronald David Whitear, Ilford, England, assignors to Imperial Chemical Industries Limited, London, and Ilford Limited, Ilford, England
No Drawing. Filed Oct. 22, 1970, Ser. No. 83,207
Claims priority, application Great Britain, Oct. 24, 1969, 52,246/69
Int. Cl. G03c 1/00, 1/64, 1/68
U.S. Cl. 96—115 P        1 Claim

ABSTRACT OF THE DISCLOSURE

This application describes a process for recording an image which comprises subjecting to image-wise light exposure a layer comprising a photo-labile organo metallic compound so as to produce an image-wise distribution of one or more active species in said layer, the said photo-labile organo metallic compound being a photo-labile cobalt or iron complex of a specified formula.

---

This invention relates to image-recording processes in which a layer comprising a photo-sensitive chemical compound is exposed to light.

According to one aspect of the present invention, an image-recording process comprises subjecting to image-wise light exposure a layer comprising a photo-liable organo-metallic compound so as to produce an image-wise distribution of one or more active species in said layer, the said photo-labile organo-metallic compound being a photo-labile cobalt or iron complex of the formula:

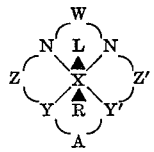

where X represents cobalt or iron in their higher oxidation state (III), Y and Y' each represent N, O or other hetero atom, R represents alkyl, substituted alkyl, allyl, aralkyl, aryl or substituted aryl, N and Y may be joined through Z to form a bidentate ligand, N and Y' may be joined through Z' to form a bidentate ligand, Z and Y being the same as or dfferent from Z' and Y', N, Z and Y or N, Z' and Y', when taken together may form part of a $\pi$ or delocalized $\pi$ system, N and N may be joined through another grouping, W. Y and Y' may be joined through another grouping A, and L may or may not be present.

When R is substituted alkyl it may be, for example, hydroxyalkyl. If L is present it may be, for example, selected from ammonia, amines, water, organic phosphine, alkyl or halogen. The metal complex may exist as a neutral compound, or as a cation or anion.

A variety of chemical reactions may be promoted by the active species, final choice being dictated by the nature of the active species produced. For example, the active species may act as an oxidation catalyst so that the exposed layer may be treated with dye-forming reagents which generate a black or colored dyestuff on oxidation in the presence of air. This particular process is described in co-pending application Ser. No. 82,724, filed on even date herewith. Alternatively, a free radical species, such as an alkyl rdical, may be produced; this may be used to catalyze a polymerization reaction, thus producing a polymeric material. Monomers which may be polymerized in this way include olefinically unsaturated monomers, such as methyl methacrylate, vinyl chloride styrene. In either example, the colored dyestuff or polymer will be generated in an image-wise distribution over the exposed layer. In general, irreversible chemical reactions are preferred.

The layer containing the organo-metallic compound may be supported in one of a variety of ways, provided that it enables the compound to be evenly distributed over a surface and held there during the image-recording process and any subsequent processing. For example, the compound may be retained in a colloid medium and coated on a film of polymer or metal, or a solution or suspension of the compound may be applied to the surface of a fibrous, textile or other absorbent material. Whatever type of surface is used to support the layer, precautions must be taken to minimize or obviate lateral migration of the organo-metallic compound and chemical reactants during exposure and subsequent processing, as this will adversely affect the sharpness of the image-record produced.

It will be appreciated that image-records produced by the process of our invention must be protected from the action of light before and after image-wise exposure, until the un-photolyzed organo-metallic compound has been removed from the exposed layer or deactivated. This is most readily accomplished after the active species has been further reacted in the chosen manner to produce a permanent image. However, it is within the scope of the invention to expose the supported layer to light to produce the image-wise distribution of active species and to store the exposed layer away from light until further processing is desired, provided that the lifetime of the active species is sufficiently long under the storage conditions. It is also possible to incorporate the aforementioned chemical reactants in the layer before exposure to light so that reaction commences immediately after exposure.

The permanent image-record produced as described above, may be the final product of our process, as when it is applied to photography or to the decoration of a fibrous or textile material. Alternatively, the image-record may be used to control a further process. For example, the layer may be supported on a metal surface, exposed to light and subsequently treated to form an image-wise pattern of polymer which may be used as a "stop-off" material to enable the unprotected parts of the metal surface to be etched to give a decorative surface or to produce a printing block or the like.

The following are examples of types of cobalt and iron complex which may be used in the process of the present invention:

As a result of the large amount of research carried out in recent years into the vitamin $B_{12}$ coenzyme complex, the structure is now known and surprisingly it contains an alkyl cobalt bond which is stabilized by various co-ordinating ligands. It is also light sensitive. Various similar derivatives have been made where the naturally occurring cobalt alkyl group is replaced by a synthetic carbon chain. Such compounds are also light sensitive. Many "model" compounds have been made in which the cobalt is complexed by a much simpler system than in the naturally occurring vitamin which stabilizes the alkyl cobalt bond (in the absence of light).

(I)

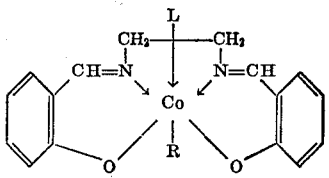

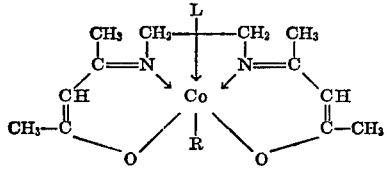

where L is only optionally present and R is alkyl or substituted alkyl or aryl. Compare the work of Costa et al., J. Organometal. Chem. 6 (1966), p. 181 and 7 (1967), p. 493.

Another group of compounds is exemplified by Formula III (III) 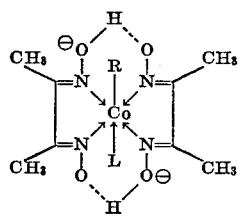

where R is alkyl or aryl or substituted alkyl and L is only optionally present. Compare Schrauzer and Windgassen, J. Amer. Chem. Soc. 88, 3738 (1966).

Recently the very similar alkyl iron and alkyl cobalt aetiporphin I complexes of Formula IV have been prepared and all were found to be light sensitive:

(IV) 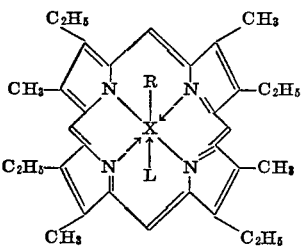

where X is cobalt or iron, R is alkyl, hydroxy alkyl or aryl, and L is only optionally present. Compare Johnson et al. J. Chem. Soc. (C) 1968, p. 882.

Other examples of light sensitive alkyl cobalt and/or iron compounds are those of the following formulae:

(V) 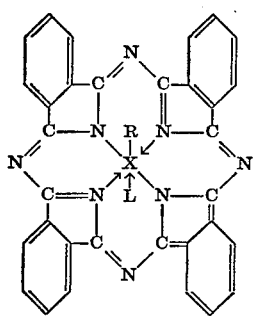

where X is cobalt or iron, R is alkyl, L is optionally present. R. Taube and M. Drews, Z. Chem. (1969) 9, p. 115.

(VI) 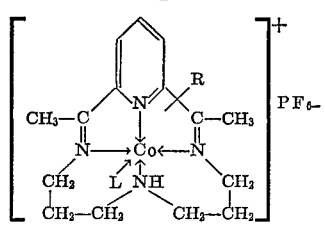

R is alkyl, allyl, aralkyl, L is halide. E. Ichiro and D. H. Busch, Chem. Comm. (1968), p. 905.

Further compounds are referred to by Pauson, Pure and Applied Chem. 17, No. 2 (1968), p. 236.

The following examples will serve to illustrate an embodiment of the invention:

In these examples the light sensitive cobalt and iron complexes act as photopolymerization catalysts. The carbon-metal bond is broken during exposure and the group containing the carbon atom is split off as a free radical which, preferably in the absence of oxygen, causes polymerization of suitable monomers, e.g. acrylates and substituted acrylates. The photographic speed of these systems is very variable but may approach the speed of silver bromide printing paper.

In these examples, all monomers were deoxygenated by blowing nitrogen through the liquids for 5 minutes prior to the polymerization. In each case a control experiment was performed without the addition of catalyst and in no case was polymer formed.

EXAMPLE 1

A catalytic quantity of ethyl cobalt$^{III}$ bis (salicylaldehyde) ethylene diimine complex (10 mgm.) was dissolved in trimethylene glycol dimethacrylate (2 ml.) in the dark and poured into a glass cell 70 x 20 x 1 mm. The mixture was imagewise exposed to a 100 w. tungsten lamp for about 1 minute. The unpolymerized portion was poured off and the image rinsed with acetone, and allowed to dry.

EXAMPLE 2

This example is essentially the same as Example 1 except that the monomer was polyethylene glycol diacrylate. Polymerization in this case was rather slower.

EXAMPLE 3

A solution of stabilized acrylic acid (7 ml.) in water (10 ml.) was treated wtih barium hydroxide (16 g.) at 25° C. and the solution filtered. The methylene blue present was removed by the addition of fuller's earth. The solution was again filtered yielding a water-white liquid.

The liquid (2 ml.) was diluted with 2-methoxyethanol (2 ml.) and the ethyl cobalt$^{III}$ bis (salicylaldehyde) ethylene diimine complex (10 mgm.) was added and dissolved by warming in the dark. It was poured into a glass cell 70 x 20 x 1 mm. The mixture was imagewise exposed to 100 w. tungsten lamp. Exposure necessary to give an image varied from 5 to 30 seconds. The non-image liquid was poured off, leaving an opaque-white image, a good negative reproduction of the original.

EXAMPLE 4

This example is essentially the same as Example 3 except the catalyst in this case was benzyl pyridine cobaloxime complex (10 mgm.). Substantially the same result was obtained.

EXAMPLE 5

The aqueous solution of barium acrylate was prepared exactly as described in Example 3. The solution (2 ml.) was diluted with 2-methoxy ethanol (2 ml.) and the methyl aquo cobaloxime complex (10 mgm.) added and dissolved by warming in the dark. It was poured into a glass cell 70 x 20 x 2 mm., then imagewise exposed to 100 w. tungsten lamp for 30 seconds. The negative image was clearly visible.

We claim as our invention:
1. A photo-sensitive material which comprises a support carrying a layer comprising (A) a photo-labile organic metallic compound and (B) an olefinically unsaturated monomer which polymerizes in the presence of a free radical polymerization initiator, the said photo-labile organo metallic compound being a photo-labile complex of the formula:

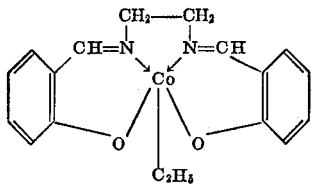

References Cited
UNITED STATES PATENTS
3,130,050   4/1964   Schwerin _____ 96—92
3,562,308   2/1971   Costa _____ 260—439

OTHER REFERENCES
Costa et al.: A New Photochemical Reaction of Organo-Cobalt$^{III}$ Complexes with Carbon Monoxide in Alcohol (1967), pp. 1781–1782.

NORMAN G. TORCHIN, Primary Examiner

W. H. LOUIE, JR., Assistant Examiner

U.S. Cl. X.R.

96—88, 92